United States Patent
Achenbach et al.

[11] Patent Number: 6,046,294
[45] Date of Patent: Apr. 4, 2000

[54] REGULATING THE RELEASE FORCE OF SILICONE COATINGS WHICH REPEL TACKY SUBSTANCES

[75] Inventors: Frank Achenbach, Simbach/Inn; Armin Fehn, Emmerting; Wolfgang Hechtl, Burghausen; Margot Kinne, Emmerting, all of Germany

[73] Assignee: Wacker-Chemie GmbH, Munich, Germany

[21] Appl. No.: 09/130,843

[22] Filed: Aug. 6, 1998

[30] Foreign Application Priority Data

Aug. 7, 1997 [DE] Germany .......................... 197 34 260

[51] Int. Cl.$^7$ .................................................. C08G 77/08
[52] U.S. Cl. .................................. 528/15; 528/31; 528/32
[58] Field of Search .................................. 528/15, 31, 32

[56] References Cited

U.S. PATENT DOCUMENTS

| | | |
|---|---|---|
| 4,611,042 | 9/1986 | Farrell et al. . |
| 4,857,564 | 8/1989 | Maxson . |
| 5,545,831 | 8/1996 | Kaiya et al. . |

FOREIGN PATENT DOCUMENTS

| | | |
|---|---|---|
| 355381 | 2/1990 | European Pat. Off. . |
| 605227 | 7/1994 | European Pat. Off. . |
| 652258 | 5/1995 | European Pat. Off. . |
| 2509620 | 9/1976 | Germany . |
| 2 230 251 | 6/1998 | United Kingdom . |

OTHER PUBLICATIONS

Derwent Abstract corresponding to DE 2509620 (#76–72361X).

*Primary Examiner*—Melvyn I. Marquis
*Attorney, Agent, or Firm*—Brooks & Kushman P.C.

[57] ABSTRACT

In silicone release coatings obtained by crosslinking compositions whose constituents comprise (A) alkenyl-functional polyorganosiloxane and an SiH-functional organosiloxane, the release force is regulated by using an SiH-functional organosiloxane (B) having from 0.1 to 60 mol-% of radicals which are incompatible with the compositions, said radicals being regarded as incompatible with the compositions when a mixture of 1 part by weight of SiH-functional organosiloxane (B) having 30 mol-% of incompatible radicals and 9 parts by weight of alkenyl-functional polyorganosiloxane (A) forms more than one phase at 20° C.

11 Claims, No Drawings

REGULATING THE RELEASE FORCE OF SILICONE COATINGS WHICH REPEL TACKY SUBSTANCES

TECHNICAL FIELD

The invention relates to a process for regulating the release force of silicone coatings and to compositions which can be crosslinked to give silicone coatings.

BACKGROUND ART

Silicone coating compositions can be applied to any substrates which are to be rendered repellent to tacky substances, and can be subsequently crosslinked to give an elastomeric silicone coating. The high level of repellency of tacky substances is one of the specific characteristics of silicones, particularly materials containing a considerable proportion of diorganosiloxane units. An essential constituent of all silicone coating compositions, consequently, is an organopolysiloxane which may, depending on the nature of crosslinking, have been functionalized. Catalysts, crosslinkers, photosensitizers, solvents, emulsifiers, fillers, resins, etc. may also be present. The crosslinking of the applied silicone coating composition to give an elastomeric silicone coating can be carried out and/or accelerated thermally, by means of high-energy particles or electromagnetic radiation, or by a combination of these methods. Thermally induced addition crosslinking through reaction of alkenyl-functional organopolysiloxanes with SiH-containing crosslinkers, in particular by platinum-catalyzed hydrosilylation, has acquired considerable practical significance. In addition to those coatings which crosslink by addition reaction, silicone coating compositions have also been described which crosslink by condensation, in the presence of peroxides, and by radiation.

Silicone coating compositions may also differ in their content of solvents, and in other manners as well. For example, the crosslinkable silicone coating compositions can include solvent or preferably be free from solvent, or may be present in the form of an aqueous emulsion.

The degree of repellency of tacky substances by the silicone coating can be quantified by the release force. The release force is a measure of the force which must be exerted in order to maintain delamination of a standardized adhesive bond at a defined rate of release, in accordance, for example, with the FINAT test methods. The test material may comprise, for example, a laminate of a siliconized release paper and an adhesive-coated test strip. The greater the release force measured, the more firmly the self-adhesive material adheres to the siliconized release paper. Although numerous factors such as temperature, rate of release, peel angle, film thickness of the adhesive material, pressure applied when producing the adhesive bond, etc. are also important, the release force depends predominantly on the nature of the tacky substance and on the type of the silicone coating.

Since the nature of the tacky substance is predetermined by the particular application, it is particularly important to be able to tailor the release properties of the silicone coating, i.e. to adapt them to the performance requirements. For example, siliconized release papers that are to be used for packaging tacky materials or for placing under dough products during the baking procedure should have a very high level of repellency for tacky substances, corresponding to very low release force values. In contrast, siliconized release papers used as a backing for labels must—depending on the size of the label paper—possess a relatively high level of release force, since otherwise the label might become prematurely detached from the backing.

Obtaining suitable release requirements for silicone coatings is difficult. In general, there is not only the need for a certain level of release force associated with a specific adhesive but moreover, this release force should also show a predetermined dependency on the rate of release. For example, the release force of the relatively small labels used to price consumer goods should be as high as possible in the state of rest and at a low peel rate, so as to preclude premature detachment in the dispensing device, whereas at a high rate of peel the release force should be as low as possible in order to enable mechanical pricing to take place rapidly and without tearing. Other applications require the converse behavior, namely high release force at high rate of peel, or release force behavior independent of the rate of release, also referred to as the peel rate. Specific requirements relating to the temperature dependency of the release force level are set, for example, for label papers suitable for laser printers.

Reproducibly tailoring the dynamic release force behavior of a silicone coating irrespective of its storage period, therefore, represents a decisive criterion for its applicability.

As a general rule, silicone coatings have a very low level of release force; in other words, the extent of the repellency of tacky substances is very high. Consequently, the problem of tailoring the release behavior is principally that of effecting an increase in release force. This targeted increase in release force is referred to as "controlled release" (CR), and the additives used for this purpose are known, correspondingly, as "controlled-release additives" (CRAs).

Numerous possibilities belonging to the prior art for tailoring, and in particular increasing, the release force level can be given. It is known, for example, that an increase in the proportion by weight of organic groups in the organopolysiloxane, which may be achieved by replacing some of the methyl groups by phenyl groups or other organic radicals of relatively high molecular mass, is associated with an increase in the release force values with respect to a range of tacky substances. The result is that an increase in the organic nature of the silicone rubber composition is accompanied by suppression of the silicone-typical release properties, thereby reducing the extent of repellency of tacky substances.

The organic nature of a silicone coating composition can be increased by various means. For example, it can be done by increasing replacement of the methyl groups, which are typically present in the organopolysiloxane, by organic radicals of relatively high molecular mass and, in particular, relatively high polarity. An alternative option is to incorporate divalent organic radicals into the siloxane main chain. Furthermore, the organopolysiloxane can be replaced in part by organic compounds, especially organic oligomers or polymers, which may contain functional groups to enable them to be incorporated by crosslinking into the silicone network, and at the same time to prevent unwanted exudation at the surface of the silicone coating.

Although such methods of regulating the release force are possible in principle, employing them is accompanied by numerous disadvantages. For instance, it is necessary to modify the organopolysiloxane forming the principal constituent, in which case the organic content in the organopolysiloxane must be increased drastically in order to obtain high release force values. The preparation of organopolysiloxanes having organic radicals of relatively high molecular mass, or of block copolymers, etc., however, is highly complex. Owing to different types of adhesives to be employed, and to different release force requirements, moreover, it would be necessary to provide a range of variously modified organopolysiloxanes. The prospects for release force regulation through the addition of organic compounds, especially those of relatively high polarity, to the silicone coating composition are equally poor, since massive compatibility problems occur which prevent the reproducible adjustment of the level of release force independently of the storage period. Such additions may, moreover, impair the crosslinking reaction necessary to cure the coating.

Particular significance as CRAs has been acquired by resinous additives essentially comprising $SiO_{4/2}$ and/or $RSiO_{3/2}$ units, and also $R_3SiO_{1/2}$ and possibly $R_2SiO_{2/2}$ units, where R is identical or different and can be —H or —OH or any substituted or unsubstituted organic radical. EP-A-652 258 describes silicone resins, and U.S. Pat. No. 4,611,042 discloses resinous siloxane copolymers, as CRA's. Disadvantages which the CRA's are manifest. For example, release force is increased markedly only at a very high content of silicone resin; silicone resins are expensive; and silicone resins cause an considerable and unwanted increase in the viscosity of the silicone coating composition, which must be compensated by choosing shorter-chain silicone polymers and/or by the use of undesirable solvents. Further, silicone resins frequently increase the extractables content of the crosslinked silicone film, which is manifested in lower values for residual adhesion. For example, a price label which is peeled off from such a siliconized paper adheres poorly to the product article because the adhesive of the label becomes contaminated with silicone. Finally, silicone resins are frequently unable to provide a low release force at low rate of peel and a high release force at high rate of peel.

The preparation of organopolysiloxanes comprising T and/or Q units is relatively complex. There is, in particular, a risk of gelling. The use of silicone resins also impairs the vulcanization characteristics, i.e. these resins reduce the rate of crosslinking. A very short crosslinking time, however, is critical for the majority of applications of silicone coating compositions, such as the siliconization of release papers. The advantage of the ready availability of linear organopolysiloxanes is abandoned when silicone resins are employed.

U.S. Pat. No. 5,545,831 describes a linear organosiloxane which does not necessarily contain SiH but necessarily includes alkylene groups between Si atoms, which can be employed as a CRA for silicone coating compositions without impairing the residual adhesion. The SiH in the CRAs disclosed is present, if at all, only at the chain ends. The chain-end SiH group, which may also be an alkenyl group, apparently serves to incorporate the CRA's by crosslinking; the increase in release force is effected by the alkylene groups, i.e. by the incorporation of organic radicals. A disadvantage is that CRAs of this kind bring about a marked increase in release force only when the CRA content is high.

EP-A-605 227 discloses a process for regulating release force which is based on tailoring the crosslinking density and/or the modulus of the silicone coating. In particular, an increase in release force at high peel rate is achieved by combining an alkenyl-terminal organopolysiloxane with an SiH-terminal organopolysiloxane, which owing to the chain extension that takes place in the course of crosslinking leads to a silicone film having a relatively low nodal density and relatively low modulus and hence a relatively high release value at high peel rate. Disadvantages of this method are that regulation of release force can be achieved only at high peel rate, and is variable, moreover, only within narrow margins, since changes in the nodal density also affect the mechanical strength, especially the abrasion resistance. In addition, as the proportion of SiH-terminal organopolysiloxanes increases, the residual adhesion is adversely affected. It is expressly stressed in the disclosure of EP-A-605,227 that the additionally required SiH crosslinker must be soluble in the silicone coating composition.

EP-A-355 381 describes controlling the release force behavior of silicone coatings by using an optionally SiH-containing organosiloxane which possesses a sufficient number of monofunctional phenolic structural units.

DE-A-25 09 620 describes a method of regulating the release force for addition-crosslinking silicone coating compositions whose principal constituent comprises diorganopolysiloxanes (I) in which from 3 to 30 mol-% of the nonterminal siloxane units are diphenylsiloxane units and at least 50% of the number of organic radicals in the remaining siloxane units are methyl radicals. By combining these phenyl-containing diorganopolysiloxanes (I) with organopolysiloxanes (II) which carry at least three Si-bonded hydrogen atoms it is possible, owing to the different concentration of Si-bonded hydrogen in the organopolysiloxane (II), to alter the release force of the resulting silicone coating continuously within wide limits. What proves disadvantageous here, inter alia, is the need to use phenyl-containing organopolysiloxanes as a principal constituent and to provide a relatively large number of different SiH-containing organopolysiloxanes (II).

SUMMARY OF THE INVENTION

The object of the present invention, therefore, is to provide compositions which can be crosslinked to silicone coatings, whose release behavior can be adjusted infinitely, reproducibly, and independently of storage period, and which do not have the above disadvantages of known methods of regulating release force.

The invention provides a process for regulating the release force of silicone coatings which are obtained by crosslinking compositions whose constituents comprise alkenyl-functional polyorganosiloxane(s) (A) and SiH-functional organosiloxane(s) by using as at least a portion of the SiH-functional organopolysiloxane(s), an SiH-functional organosiloxane (B) having from 0.1 to 60 mol-% of radicals which are incompatible with the compositions, said radicals being regarded as incompatible with the compositions when a mixture of 1 part by weight of SiH-functional organosiloxane (B) having 30 mol-% of incompatible radicals and 9 parts by weight of alkenyl-functional polyorganosiloxane (A) forms more than one phase at 20° C.

The invention also provides compositions which can be crosslinked to silicone coatings and whose constituents comprise alkenyl-functional polyorganosiloxane(s) (A) and SiH-functional organosiloxane(s), wherein at least a portion of the SiH-functional organpolysiloxane(s) comprises one or more SiH-functional organosiloxane(s) (B) having from 0.1 to 60 mol-% of radicals which are incompatible with the compositions, said radicals being regarded as incompatible with the compositions when a mixture of 1 part by weight of SiH-functional organosiloxane (B) having 30 mol-% of incompatible radicals and 9 parts by weight of alkenyl-functional polyorganosiloxane (A) forms more than one phase at 20° C.

The silicone coating compositions can be crosslinked to give elastomeric silicone coatings.

DETAILED DESCRIPTION OF THE INVENTION

The regulation of release force takes place by regulating the extent of the incompatibility of the SiH-functional organosiloxane (B) with the silicone coating composition which comprises alkenyl-functional polyorganosiloxane (A). When the proportion of radicals that are incompatible with the composition in the SiH-functional organosiloxane (B) is increased the release force is raised, and when said proportion of incompatible radicals is reduced said force is lowered. Preferably, the release force is raised.

The transition between full compatibility and immiscibility is not sharply defined. Therefore, a CRA effect is observed even when the compatibility of the SiH-containing organosiloxane compound with the silicone coating composition is still such that no turbidity is in evidence.

SiH-containing organosiloxane compounds which include a very high content of incompatibilizing groups are virtually impossible to incorporate into the silicone coating composition, which then automatically leads to disruptions to the crosslinking process, lack of homogeneity of the silicone film surface, tackiness, etc. In the present invention, the extent of the incompatibility is chosen such that substantially homogeneous incorporation into the silicone coating composition by mixing is still possible, although any turbidity evident in the mixture shows it to be a microphase-separated system.

The SiH-functional organosiloxane (B) preferably has from 0.5 to 30 mol-%, in particular from 1 to 20 mol-%, of radicals that are incompatible with the compositions.

The release force of the silicone coatings obtainable by crosslinking the crosslinkable compositions can be adjusted stably and reproducibly within wide limits by means of the SiH-functional organosiloxane (B) without impairing the remaining properties, such as rate of crosslinking, residual adhesion, abrasion resistance, or extractables content. These latter properties, indeed, are improved. The use of SiH-functional organosiloxane(s) (B) having incompatible groups is in contrast to the prior art, where the concern has always been quite the opposite: to preserve a high compatibility between all constituents, since incompatibilities have been associated with poor reproducibility, vulcanization defects, high content of uncrosslinked constituents which hence will be later exuded, tackiness, and other disadvantages.

Release force regulation by SiH-containing organosiloxanes of reduced compatibility has numerous additional advantages. First, the diverse and difficult requirements for the dynamic release force behavior of silicone coatings, for example, high release values at high peel rates, can be met much more simply by an appropriate selection and/or differing content of the groups which reduce the compatibility of the SiH-containing organosiloxane compound. Second, the release values established by using the process of the invention are more stable, i.e. less dependent on the storage period of the silicone coating, than is the case when using conventional methods.

The modified crosslinkers bring about, in addition, an improvement in numerous performance-relevant properties of the silicone coatings. These advantages relate, in particular, to addition-crosslinking silicone coating compositions. These compositions possess lower contents of extractable constituents owing to more complete crosslinking, exhibit higher abrasion resistance, and a higher rate of crosslinking.

Owing to the relatively high rate of crosslinking of addition-crosslinking silicone coating compositions, further advantages can be derived from the process of the invention. The content of platinum catalyst in the silicone coating composition can be reduced while maintaining the crosslinking rate, which leads to cost savings. These advantages arise in particular in the case of low temperature curing (LTC) coating compositions.

The type of crosslinking of the silicone coating composition is not important. It may take place, for example, by precious metal-catalyzed hydrosilylation reaction between the alkenyl-functional polyorganosiloxane (A) and the SiH-functional organosiloxane (B); by tin-catalyzed condensation reaction between a silanol-containing organosiloxane and an alkoxy-functional silane; by peroxidic crosslinking; or by radiation crosslinking.

The SiH-functional organosiloxane (B) preferably acts as a crosslinker. It is preferred to employ compositions which include a hydrosilylation catalyst (C).

Preferably, the compositions which can be crosslinked to give silicone coatings are addition-crosslinkable silicone rubber compositions whose constituents comprise (A) alkenyl-functional polyorganosiloxane, (B) SiH-functional organosiloxane and (C) hydrosilylation catalyst. More than one type of each component may be present.

The alkenyl-functional polyorganosiloxane (A) is preferably composed of at least 90 mol-% of structural units of the general formula (1)

and structural units of the general formula (2)

in which

A is a methyl, ethyl, propyl or butyl radical,

R is identical or different at each occurrence and is a monovalent, unsubstituted or halo- or cyano-substituted $C_1$–$C_{10}$ hydrocarbon radical whose attachment to silicon may be by way of an organic divalent group and which contain aliphatic carbon-carbon multiple bonds, $R^1$ is identical or different at each occurrence and is a monovalent, unsubstituted or halo- or cyano-substituted, SiC-bonded $C_1$–$C_{10}$ hydrocarbon radical free from aliphatic carbon-carbon multiple bonds, and a and b are 0, 1, 2 or 3, with the proviso that there are at least two radicals R in each molecule. The tetravalency of the silicon atom dictates that (a+b) is no greater than 3.

The alkenyl groups R are amenable to an addition reaction with an SiH-functional crosslinking agent. It is normal to use alkenyl groups having 2 to 6 carbon atoms, such as vinyl, allyl, methallyl, 1-propenyl, 5-hexenyl, butadienyl, hexadienyl, cyclopentenyl, cyclopentadienyl, or cyclohexenyl, preferably vinyl and allyl.

Organic divalent groups by way of which the alkenyl groups R may be attached to polymer chain silicon consist, for example, of from 1 to 20 oxyalkylene units. The radicals R can be attached in any position of the polymer chain, especially to the terminal silicon atoms.

Examples of $R^1$ are alkyl groups such as methyl, ethyl, propyl, butyl and hexyl; aryl and alkaryl groups such as phenyl, tolyl, xylyl, mesityl, benzyl, β-phenylethyl and naphthyl, or substituted groups, such as 3,3,3-trifluoropropyl, o-, p- and m-chlorophenyl, bromotolyl and β-cyanoethyl. Preferred substituents are fluoro, chloro and bromo. $R^1$ preferably has 1 to 6 carbon atoms. Particular preference is given to methyl and phenyl.

The SiH-functional organosiloxane (B) of reduced compatibility which functions as the CRA is preferably composed of structural units of the general formula (3)

$$A_c R^2_d SiO_{(4-c-d)/2} \quad (3)$$

and structural units of the general formula (4)

$$H_e A_f R^2_g SiO_{(4-e-f-g)/2} \quad (4)$$

in which

A is defined as above;

$R^2$ is an organic or inorganic radical other than hydrogen and A;

c and d are 0, 1, 2 or 3;

e is 1, 2 or 3; and f and g are 0, 1 or 2, with the proviso that (d+g) is from 0.1 to 60 mol-% of (c+d+e+f+g) and each molecule includes at least 2 structural units of the general formula (4). The tetravalency of the silicon atom dictates that (c+d) and (e+f+g) are each no greater than 3. $R^2$ can also be a half-bivalent, third-trivalent or quarter-tetravalent radical.

Since the principal constituent of the silicone coating compositions developed for the purpose of repelling tacky substances is an organopolysiloxane comprising nonpolar groups A, it is possible to induce incompatibility with the silicone coating composition by choosing groups $R^2$ which are preferably of relatively high polarity and/or are aromatic groups in the SiH-containing organosiloxane compound (B). An extremely wide range of groups is available for this purpose, and so these groups will be indicated below only by way of example, preference being given to those groups which do not impair the crosslinking process of the silicone coating composition. In addition, preference is given to relatively low molecular weight groups which do not unnecessarily lower the ponderal SiH-content of the SiH-containing organosiloxane compound of reduced compatibility. $R^2$ is preferably attached to the main chain and not to a branching site of the SiH-containing organosiloxane compound (B).

It is not the proportion of $R^2$ incorporated into the SiH-containing organosiloxane compound (B) which itself brings about the increase in release force but rather the CRA effect of the resultant reduced compatibility of the SiH-containing organosiloxane compound (B) with the silicone coating composition. For this reason, considerably higher release force values can be established even when the silicone coating composition contains not more than 10% by weight of this SiH-containing compound, which in turn contains no more than 10 mol-% of radicals $R^2$ of relatively high polarity. If the corresponding amount of these radicals $R^2$ were to be incorporated not into the SiH-containing organosiloxane compound, but into the organopolysiloxane which functions as the principal constituent, the increase found in the release force would be marginal at best.

The silicone coating composition preferably contains from 0.5 to 20% by weight, in particular from 1 to 10% by weight, of organosiloxane compound (B).

$R^2$ can be a monovalent radical which is other than A and hydrogen, and which preferably, but not necessarily, is free from aliphatic double bonds. Representative examples of $R^2$ are unsubstituted or halo-substituted hydrocarbon radicals having up to 20 carbon atoms, examples being alkyl radicals such as n-pentyl, isopentyl, neopentyl, tert-pentyl and dodecyl; cycloalkyl radicals such as cyclopentyl, cyclohexyl, methylcyclohexyl, ethylcyclohexyl, cycloheptyl and norbornyl radicals; alkenyl radicals such as vinyl, allyl, 5-hexenyl, cyclopentenyl, 4-vinylcyclohexyl and 3-norbornenyl; aryl radicals such as phenyl, naphthyl, biphenylyl, anthryl and phenanthryl; alkaryl radicals such as benzyl, phenylethyl and phenylpropyl; alkylaryl radicals such as p-tolyl and p-xylyl; alkenylaryl radicals such as vinylphenyl; aralkenyl radicals such as styryl; and halo-substituted hydrocarbon radicals such as chloromethyl, 3-chloropropyl, 3-bromopropyl, β-chloroethyl, 3,3,3-trifluoropropyl, 2-fluoroethyl, 1,1-dihydroperfluorododecyl, trifluorotolyl, chlorophenyl, dichlorophenyl and tetrachlorophenyl.

$R^2$ can additionally be a monovalent radical which contains heteroatoms, especially O, S, N and P, and has up to 20 carbon atoms, such as

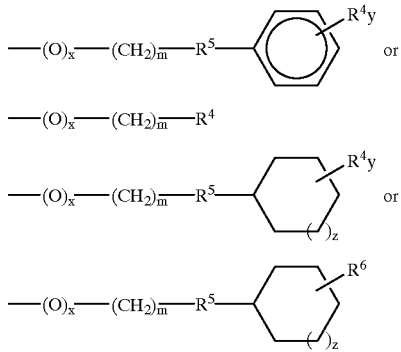

where the bivalent radical $R^5$ can be, for example, —O—, —C(O)—, —C(O)O—, —OC(O)—, —OC(O)O—, —NH—, —NR$^3$—, —C(O)—NH—, —C(O)—NR$^3$—, —C(O)O—NH—, —C(O)O—NR$^3$—, —NH—C(O)—, —NH—C(O)O—, —NR$^3$—C(O)—, —NR$^3$—C(O)O—, —CH=CH—, —C(CH$_3$)=CH—, —CH=C(CH$_3$)—, —C(=CH$_2$)—, —C(CF$_3$)$_2$—, —SO$_2$—, —SO—, —OSi(CH$_3$)$_2$O—, —Ph—, —CH$_2$—Ph—CH$_2$—, CH$_2$—CH$_2$—Ph—CH$_2$—CH$_2$—, —CH$_2$—CH(CH$_3$)—Ph—CH(CH$_3$)—CH$_2$—;

where the radicals $R^4$ can be identical or different and are selected from the group of the halogens; chalcogenides; alkyl; cycloalkyl; alkenyl and cycloalkenyl radicals having up to 20 carbon atoms; monovalent aromatic radicals having up to 30 carbon atoms, which can be substituted or unsubstituted; and aromatic or nonaromatic, cyclic or noncyclic radicals which contain heteroatoms, such as O, S, N, P, and have up to 30 carbon atoms.

Examples of radicals $R^4$ are —F, —Cl, —Br, —I, —CN, —CF$_3$, —N$_2$R$^3$, —OH, —OR$^3$, —C(O)OH, —C(O)OR$^3$, —C(O)R$^3$, —(CH$_2$)$_m$O(CH$_2$)$_n$C—(O)—CH$_2$, —C(O)—CH$_2$—C(O)—CH$_3$, —(CH$_2$)$_m$—C(O)—R$^3$, —CN, —C(O)NH$_2$, —C(O)NHR$^3$, —C(O)NR$^3_2$, —NH$_2$, —NHR$^3$, —NR$^3_2$, —PR$^3_2$, —N(R$^3$)C(O)NR$^3_2$, —NCO, —SCN, —NO$_2$.

The radicals $R^3$ can be identical or different unsubstituted or halo-substituted hydrocarbon radicals having up to 20 carbon atoms.

The radicals $R^6$ can be identical or different and can be selected from the group of the radicals $R^4$ plus =O and =S.

x is 0 or 1.

y is 1, 2, 3, 4 or 5.

z is 0, 1, 2, 3, 4 or 5.

m and n are each 0 or from 1 to 20, in particular from 1 to 5.

Examples of radicals $R^2$ are —$(CH_2)_m$—CH(OH)—$CH_2$(OH), —$(CH_2)_m$—$(OCH_2CH_2)_n$—$OR^3$, —$(CH_2)_m$—O—C(O)$R^3$, —$(CH_2)_m$—O—C(O)$CH_2$C(O)$R^3$—$(CH_2)_m$—O—C(O)—C(H,$R^3$)=$CH_2$ —$(CH_2)_m$—CH($NH_2$)—C(O)$OR^3$, —$(CH_2)_m$—O—Ph—(tert-butyl), —$(CH_2)_m$—$SO_2$—Ph, —$(CH_2)_m$—O—$CH_2$—CH—(O)—$CH_2$, —O—$(CH_2)_m$—$CF_2$—$CHF_2$, —$(CH_2)_m$—O—$C_6F_5$, —$(CH_2)_m$—O—$C_6H_2Br_3$, where Ph is a phenyl radical.

$R^2$ can be a heteroatom-containing, monovalent radical of complex composition, such as

—$(O)_x$—$(CH_2)_m$—$R^5$—$R^7$ where x is 0 or 1, and where the monovalent radical $R^7$ is, for example, one of the following radicals which may if desired be substituted by $R^4$ and/or $R^6$:

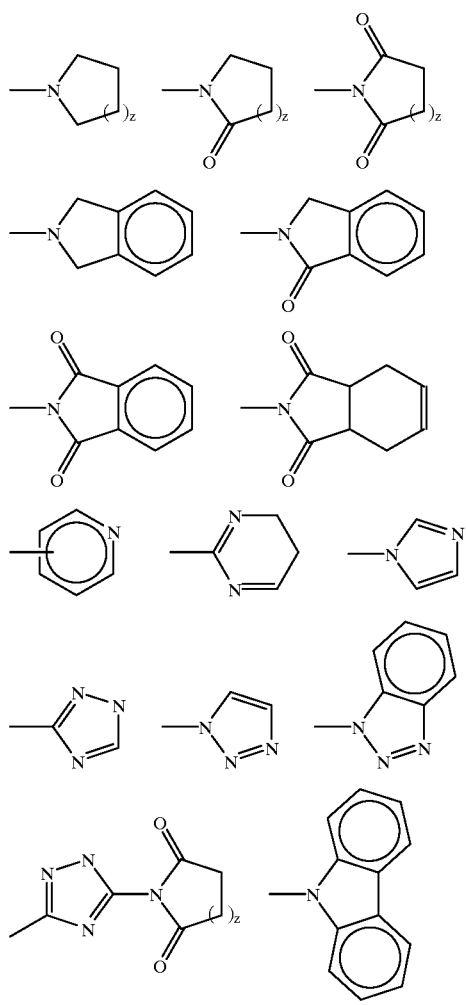

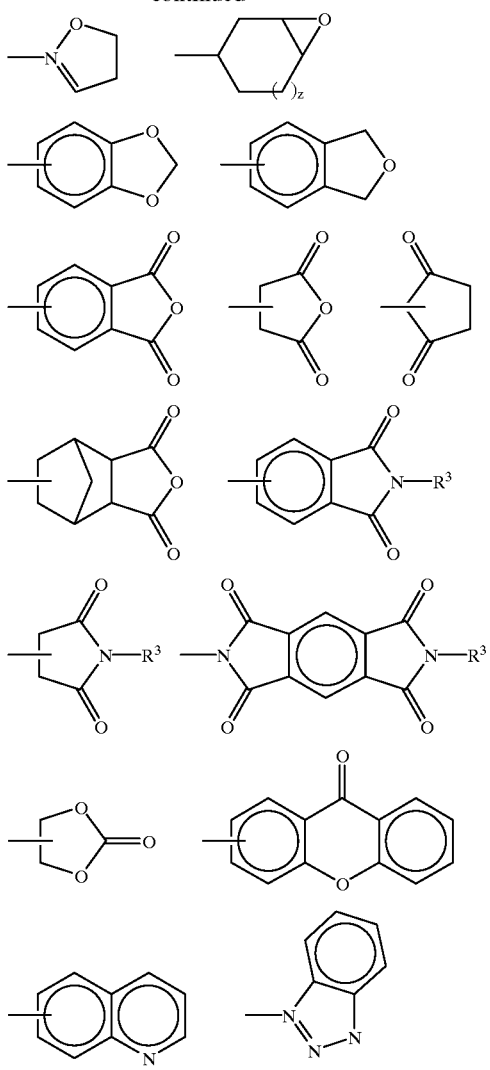

The bi-, tri- or tetravalent radicals $R^2$, preference being given to bivalent radicals, can likewise be organic radicals the choice of which is arbitrary per se, preference being given to those radicals which do not hamper the crosslinking process of the silicone coating composition. Preference is given to hydrocarbon radicals which possess from 1 up to a maximum of 30 carbon atoms, which can be unsubstituted or substituted and which can contain heteroatoms, such as O, S, N and P. Examples thereof are radicals of the general formula:

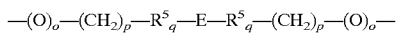

—$(O)_o$—$(CH_2)_p$—$R^5_q$—E—$R^5_q$—$(CH_2)_p$—$(O)_o$— where o and p are 0 or 1 and q is 0 or from 1 to 10 and

E is a bivalent radical which can be selected preferably from the following, unsubstituted or substituted alkylene or cycloalkylene radicals: —$CH_2$—, —$CH_2CH_2$—, —CH($CH_3$)—$CH_2$—, —C(=$CH_2$)—$CH_2$—, —CH=CH—, —C($CH_3$)=CH—, —C($CH_3$)=C($CH_3$)—, —C($CH_3$)$_2$—, —$(CH_2)_m$—, —$(CH_2O)_m$—, —$(CH_2CH_2O)_m$—, where m is as defined above.

E can also be:
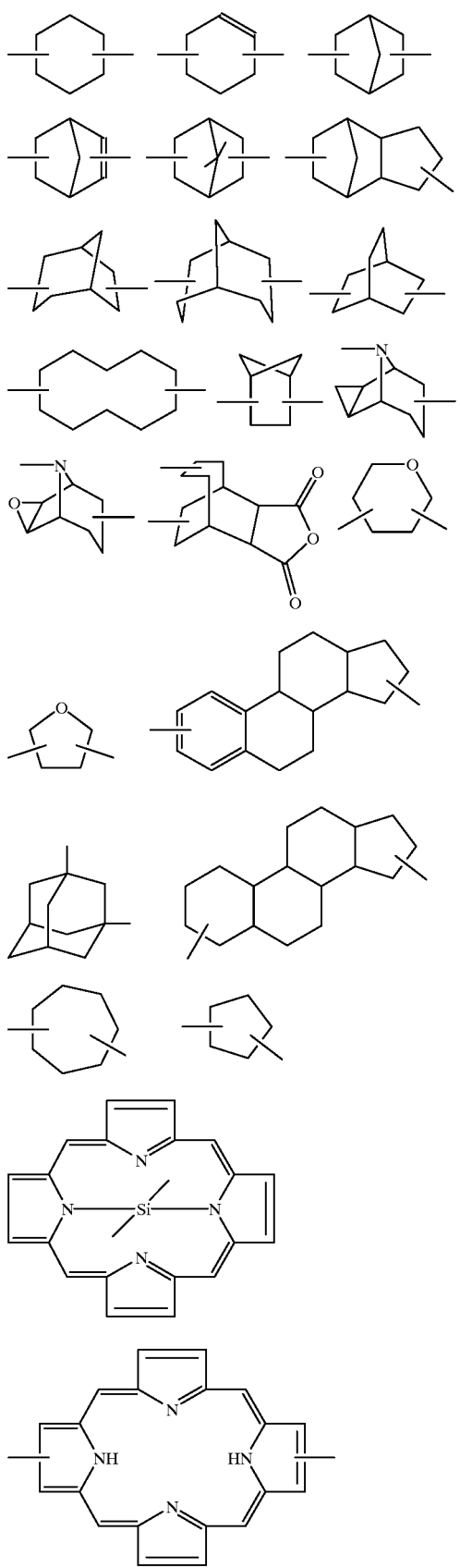
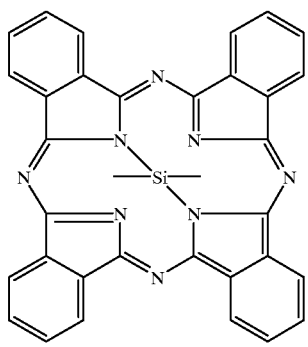
where these radicals can if desired be substituted by radicals $R^4$ and/or $R^6$. Further examples of E are given in the following formulae, it being possible for these arylene radicals to be substituted in turn by the radicals $R^4$ and/or $R^6$ and to contain heteroatoms:
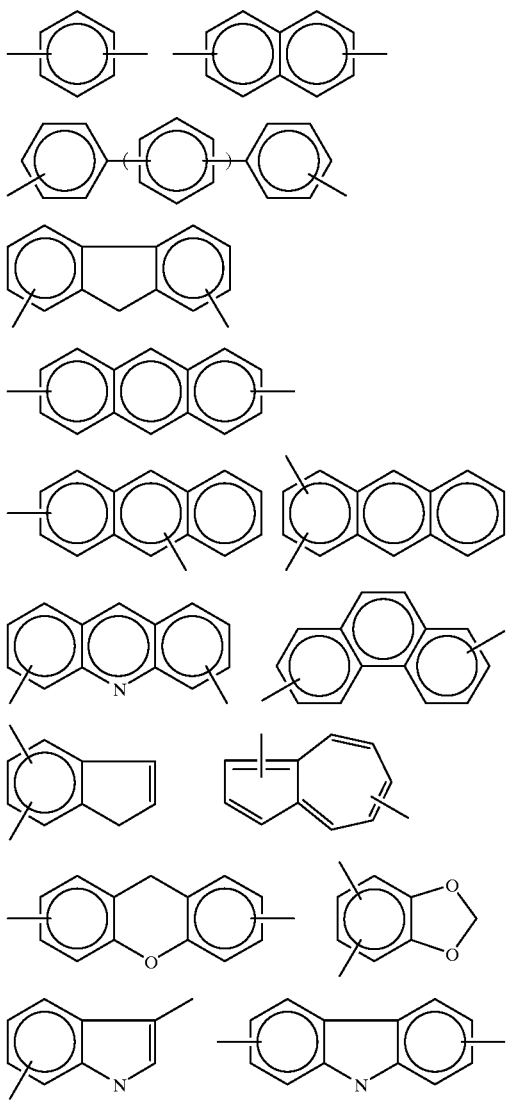

-continued

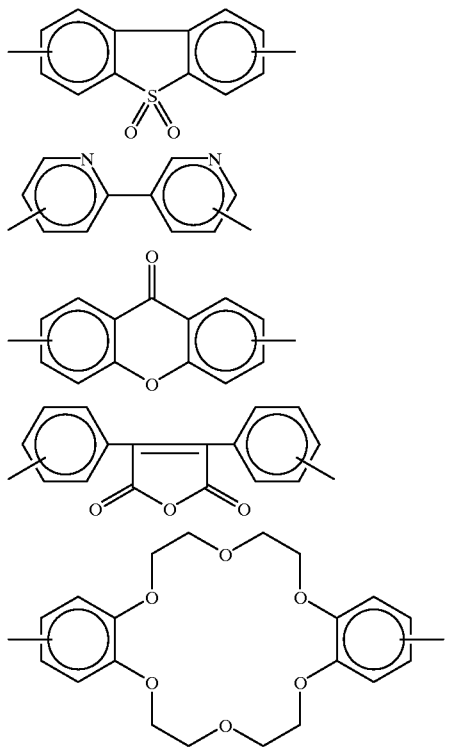

where r is 0 or from 1 to 10.

Further preferred radicals $R^2$ correspond to the general formula

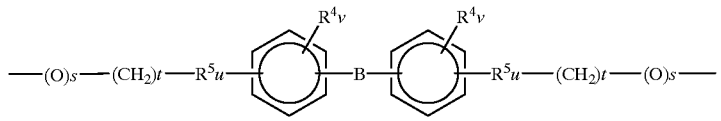

where
s and u are 0 or 1,
v is 0, 1, 2, 3 or 4,
t is 0 or from 1 to 10,
$R^4$ and $R^5$ are as defined above for these radicals and
B is one of the following bivalent units:
—O—, —C(O)—, —C(O)O—, —OC(O)O—, —OC(O)—C(O)O—, —C(O)—C(O)—, —CH$_2$—O—C(O)O—, —NH—, —NR$^3$—, —C(O)—NH—, —C(O)—NR$_3$—, —NH—C(O)O—, —NH—C(O)—NH—, —NR$^3$—C(O)—NR$^3$—, —NR$^3$—C(O)O—, —(CH$_2$)$_m$—, —CH(OH)—CH(OH)—, —CH=CH—,
—C(CH$_3$)=CH—, —C(=CH$_2$)—, —C(CH$_3$)$_2$—, —C(CH$_2$CH$_3$) =C(CH$_2$CH$_3$)—, —C(CF$_3$)$_2$—, —SO$_2$—, —SO$_2$—NH—, —SO$_2$—NR$^3$—, —SO—, —S—S—, —S—, —OSi(CH$_3$)$_2$O—, —O—CH$_2$—, —O—(CH$_2$)$_m$—O—, —(CH$_2$)$_m$—O—(CH$_2$)$_n$—, —CH$_2$—CH—(O)—CH—CH$_2$—, —CH=CH—C(O)—CH$_2$—C(O)—CH=CH—, —C(O)—CH$_2$—, —C(O)—CHBr—, —C(O)—C(Ph)$_2$—, —C(O)—(CH$_2$)$_m$—C(O)—, —C(O)—CH=CH—,
where m and n are as defined above.

Further preferred radicals $R^2$ can be represented by the following general formula:

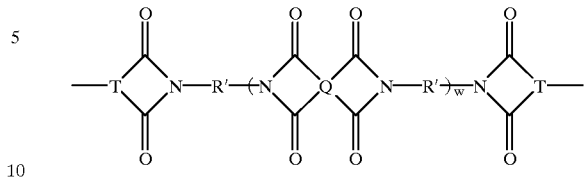

where
w is an integer from 0 up to and including 300,
T is a trivalent substituted or unsubstituted aliphatic radical having 1 to 18 carbon atoms or a trivalent substituted or unsubstituted aromatic radical having 6 to 18 carbon atoms, and
R' can be identical or different at each occurrence and is a bivalent, unsubstituted or halo-substituted aromatic hydrocarbon radical having 6 to 30 carbon atoms, alkylene or cycloalkylene radical having 2 to 20 carbon atoms or a bivalent radical of the formula

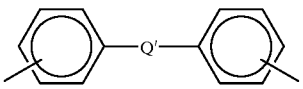

in which
Q' is a divalent, substituted or unsubstituted organic radical having 1 to 20 carbon atoms;
Q is a tetravalent aromatic radical selected from the following groups:

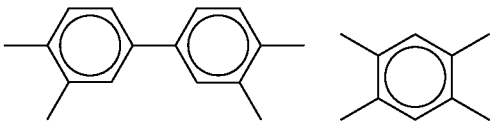

or

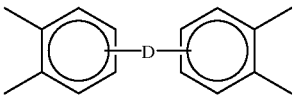

in which D can be one of the following groups:
—O—, —S—, —C(O)—, —C(CF$_3$)$_2$—, —S(O)$_2$—, $C_hH_{2h}$—, —C(O)—O—R'—O—C(O)—and —O—R'—O— and h is an integer from 1 up to and including 5.

Further particularly preferred bivalent radicals for $R^2$ are the following imide structures of the general formula:

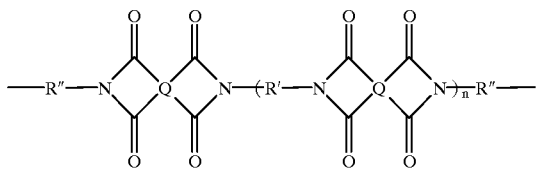

where the radicals Q and R' are as defined above for these radicals and R" is a bivalent, substituted or unsubstituted hydrocarbon radical, such as an alkylene or cycloalkylene radical having 2 to 20 carbon atoms, an aromatic radical having 6 to 30 carbon atoms or a heteroatom-containing cyclic or noncyclic, aromatic or nonaromatic radical.

Hydrosilylation catalyst (C) serves as a catalyst for the addition reaction, which is called hydrosilylation, between the alkenyl groups of the constituent (A) and the silicon-bonded hydrogen atoms of the constituent (B). Numerous suitable hydrosilylation catalysts have been described in the literature. In principle it is possible to use all prior art hydrosilylation catalysts which have been employed in addition-crosslinking silicone coating compositions.

As hydrosilylation catalysts (C) it is possible to employ metals and compounds thereof, such as platinum, rhodium, palladium, ruthenium and iridium, preferably platinum. The metals may if desired be present fixed on finely divided support materials, such as activated carbon, metal oxides, such as alumina, or silica.

Preference is given to the use of platinum and platinum compounds. Particular preference is given to those platinum compounds which are soluble in polyorganosiloxanes. Examples of soluble platinum compounds which can be used are the platinum-olefin complexes of the formulae $(PtCl_2.olefin)_2$ and $H(PtCl_3.olefin)$, with preference being given to employing alkenes having 2 to 8 carbon atoms, such as ethylene, propylene, isomers of butene and of octene, or cycloalkenes having 5 to 7 carbon atoms, such as cyclopentene, cyclohexene and cycloheptene. Further soluble platinum catalysts are the platinum-cyclopropane complex of the formula $(PtCl_2C_3H_6)_2$, the reaction products of hexachloroplatinic acid with alcohols, ethers and aldehydes and/or mixtures thereof, or the reaction product of hexachloroplatinic acid with methylvinylcyclotetrasiloxane in the presence of sodium bicarbonate in ethanolic solution. Particular preference is given to complexes of platinum with vinylsiloxanes, such as sym-divinyltetramethyldisiloxane.

The hydrosilylation catalyst (C) can also be employed in microencapsulated form, in which the solid which contains the catalyst and which is finely divided and insoluble in the polyorganosiloxane is, for example, a thermoplastic, such as polyester resin or silicone resin. The hydrosilylation catalyst (C) can also be employed in the form of an inclusion compound in, for example, a cyclodextrin.

The amount of hydrosilylation catalyst (C) employed depends on the desired crosslinking rate and on economic factors. When using customary platinum catalysts, the content of platinum metal in the crosslinkable silicone coating composition is preferably in the range from 0.1 to 500 ppm by weight, in particular from 10 to 100 ppm by weight, of platinum metal.

The silicone coating composition may optionally include as constituent (D) further additives in a proportion of up to 70% by weight, preferably from 0.01 to 40% by weight. These additives may be, for example, fillers, resins, dispersing auxiliaries, adhesion promoters, inhibitors, pigments, dyes, plasticizers, heat stabilizers, etc. They also include additives such as highly disperse silica, quartz flour, diatomaceous earth, clays, chalk, lithopones, carbon black, graphite, metal oxides, metal carbonates, metal sulfates, metal dusts, fibers, dyes, pigments, etc.

Additives which may be present in particular are those which serve to tailor the processing time and crosslinking rate of the silicone coating composition. These inhibitors and stabilizers are very well known in the field of addition-crosslinking compositions. Examples of customary inhibitors are acetylenic alcohols, such as ethynylcyclohexanol and 2-methyl-3-butyn-2-ol, polymethylvinylcyclosiloxanes, such as methylvinylcyclotetrasiloxane, low molecular weight silicone oils having dimethylvinyl-$SiO_{1/2}$ end groups and/or methylvinyl-$SiO_{2/2}$ units, trialkyl cyanurates, alkyl maleates, such as diallyl maleate and dimethyl maleate, alkyl fumarates, such as diethyl fumarate and diallyl fumarate, organic hydroperoxides, such as cumene hydroperoxide, tert-butyl hydroperoxide and pinane hydroperoxide, organic peroxides, organic sulfoxides, organic amines and amides, phosphines and phosphites, nitrites, diaziridines and oximes.

Addition-crosslinking silicone coating compositions, which may alternatively be free from solvent, which may contain solvent, or which may be in the form of an aqueous emulsion, represent a preferred application of the process of the invention. In this case the process of the invention can be implemented by modifying the SiH crosslinker, which is in any case present in the silicone coating composition, in such a way that it has reduced compatibility with the silicone coating composition.

Particularly high release force is exhibited by silicone coating compositions whose principal constituents are composed predominantly of the readily available and hence particularly preferred dimethylsiloxy units. Organopolysiloxanes whose organic radicals are essentially methyl radicals, apart from a few functional groups which preferably make up not more than 5, in particular not more than 2, mol-% of the radicals in the components (A) and (B), are therefore among the particularly preferred silicones; they can be crosslinked to give elastomeric silicone coatings which are notable for a very low level of release force.

Silicone coating compositions can be applied to basically any desired substrates, such as paper, examples being parchment paper, clay-coated papers, kraft papers, cardboard packaging, polyethylene and polypropylene-coated papers; leather, textiles, films, e.g. LDPE, HDPE, PP, polyesters, PVC; plastics generally, metals, e.g. metal drums, in order to obtain a surface which repels tacky substances, it being necessary for the extent of the repellency of tacky substances to be tailored. The silicone coating compositions are employed in the production of, for example, pressure-sensitive adhesive tapes, electrical insulating tapes, release papers for the foods sector, for hygiene articles, for labels, etc.

In the examples which follow, unless specified otherwise, a) all amounts are by weight;

b) all pressures are 0.10 MPa (abs.);

c) all temperatures are 20° C.;

d) ppw denotes part(s) by weight.

EXAMPLES

The CRA effect of the SiH-containing organosiloxanes of reduced compatibility was characterized using standardized, addition-crosslinking silicone coating compositions to which the SiH-containing organosiloxane compounds described below—which function simultaneously as CRA and crosslinker—were added in the amount described below. The SiH-containing organosiloxane compound was mixed in at room temperature without the aid of solvents.

The composition of the addition-crosslinking silicone coating composition corresponds to 99.75 ppw of a dimethylvinylsiloxy-terminal polydimethylsiloxane having a viscosity of 500 mPa.s at 25° C., 0.25 ppw of ethynylcyclohexanol (functions as inhibitor), 1.00 ppw of a platinum catalyst which comprises 1.0% by weight of elemental platinum and is a solution of a platinum-sym-divinyltetramethyldisiloxane complex in a dimethylvinylsiloxy-terminal polydimethylsiloxane having a viscosity of 1 Pa.s at 25° C., and a variable amount, described below, of an SiH-containing organosiloxane compound which functions as crosslinker and, in the case of the inventive examples, also as a CRA.

Following the intimate mixing of the constituents, the crosslinkable silicone coating composition was applied in a thin film by drawing it with a glass rod onto a standardized parchment paper (obtainable from Bosso under the designation Buxil® 925; 65 g/m$^2$). The amount applied is 4 g/m$^2$. Crosslinking took place subsequently in a circulating-air drying cabinet at a temperature of 150° C. for a time which is variable and is indicated below. The siliconized parchment papers were then characterized, in accordance with the technique laid down in the FINAT test methods (described in: "FINAT Technical Handbook"; 4th edition; 1995; publisher: FINAT—International Federation of the Producers and Processors of Pressure-sensitive and Hotmelt Adhesive Labels on Paper or other Substrates), in terms of the release force at a low rate of peel (FINAT test method 10), the release force at a high rate of peel (FINAT test method 4) and the residual adhesion (FINAT test method 11). These tests were carried out using two different commercial self-adhesive tapes (obtainable from Beiersdorf under the designation "Tesafilm® No. 4154", "Tesafilm® No. 7475" and "Tesafilm® No. 7476"; width 25 mm).

The preparation of SiH-containing organosiloxane compounds having reduced compatibility with the above-described addition-crosslinking silicone coating composition is described in the following examples.

Example 1

25 g of a trimethylsiloxy-terminal copolymer consisting of dimethylsiloxy and phenylmethylsiloxy units in a molar ratio of 1:1.65 and having a viscosity at 25° C. of 95 mPa.s are admixed with a 20% strength by weight solution of PNCl$_2$ in toluene such that the content of PNCl$_2$ is 150 ppm by weight, and the mixture is heated to 70° C. While stirring is continued at a temperature of 70° C., 135 g of a trimethylsiloxy-terminal polymethylhydrosiloxane, Me$_3$Si—(—O—SiH(Me))$_n$—O—SiMe$_3$, which according to $^{29}$Si-NMR has an average chain length n of 53, corresponding to an H content (Si-bonded hydrogen) of 1.58% by weight, are then added dropwise (over 30 minutes) such that the reaction mixture remains clear. Occasionally, further PNCl$_2$ solution is added so that the PNCl$_2$ content of the reaction mixture is about 150 ppm by weight. Following addition of the polymethylhydrosiloxane, the mixture is equilibrated for 5 minutes and then cooled to room temperature. The mixture is dissolved in 200 ml of methylene chloride, the equilibration catalyst is deactivated with 1 ml of 25% strength ammonia solution and the entire solution is dried carefully over dry sodium sulfate. The methylene chloride is subsequently stripped off under a gentle vacuum; a turbid oil is obtained which is allowed to stand overnight and then the next day is filtered over a suction filter; a clear colorless copolymer is obtained whose H content (Si-bonded hydrogen) was determined by wet-chemical means as 1.27% by weight. In 100 g of a dimethylvinylsiloxy-terminal polydimethylsiloxane which at 25° C. has a viscosity of 500 mPa.s, 10 g of the reaction product can be mixed homogeneously without any evidence of turbidity when the two components are mixed.

Example 2

The preparation is as in Example 1 but 35 g of the phenyl-containing copolymer are equilibrated with 125 g of polymethylhydrosiloxane. The H content of the reaction product was determined by wet-chemical means as 1.18% by weight. The reaction product can be mixed homogeneously with a dimethylvinylsiloxy-terminal polydimethylsiloxane having a viscosity at 25° C. of 500 mPa.s, with reduced compatibility of the components being evident from a very slight milky white turbidity.

Example 3

The preparation is as in Example 1 but 45 g of the phenyl-containing copolymer are equilibrated with 115 g of polymethylhydrosiloxane. The H content of the reaction product was determined by wet-chemical means as 1.05% by weight. The reaction product can be mixed homogeneously with a dimethylvinylsiloxy-terminal polydimethylsiloxane having a viscosity at 25° C. of 500 mPa.s, with reduced compatibility of the two components being evident from a slight milky white turbidity when the two components are mixed.

Example 4

The preparation is as in Example 1 but 55 g of the phenyl-containing copolymer are equilibrated with 105 g of polymethylhydrosiloxane. The H content of the reaction product was determined by wet-chemical means as 0.98% by weight. The reaction product can be mixed homogeneously with a dimethylvinylsiloxy-terminal polydimethylsiloxane having a viscosity at 25° C. of 500 mPa.s, but with a markedly milky white turbidity being observed when the two components are mixed, which indicates a microphase-separated distribution of the SiH-containing copolymer in the polydimethylsiloxane.

Example 5 (noninventive comparative example)

The SiH-containing crosslinker component employed is a trimethylsiloxy-terminal polymethylhydrosiloxane, Me$_3$Si—(—O—SiH (Me))$_n$—O—SiMe$_3$, which according to $^{29}$Si-NMR has an average chain length n of 53, corresponding to an H content (Si-bonded hydrogen) of 1.58% by weight. This polymethylhydrosiloxane can be dissolved in the silicone coating composition with complete homogeneity and without any evidence of turbidity.

The paper silicone coatings produced using the SiH-containing organosiloxane compounds (Example 1 to Example 5) were characterized in terms of their dynamic release force behavior relative to two different adhesive tapes; the results are listed in Tables 1 and 2. Initially it can be seen that the compositions formulated using the SiH crosslinkers described in Examples 1 to 5 give dry, nontacky silicone films on the parchment paper, crosslinking having been carried out in each case for 5 seconds in a circulating-air drying cabinet at a temperature of 150° C. The siliconized parchment papers were adhered to either Tesafilm® No. 7475 or Tesafilm® No. 4154 and, following aging of the laminates for 20 hours at 70° C. under a load of 70 g/cm$^2$, were characterized in terms of their dynamic release force behavior in accordance with the FINAT test methods.

TABLE 1

Dynamic release force behavior relative to
Tesafilm ® No. 7475; crosslinking: 5 seconds at 150° C.

| SiH Compd. of Example | Amount (ppw) | RF 0.3 m/min [N/m] | RF 10 m/min [N/m] | RF 50 m/min [N/m] | RF 100 m/min [N/m] | RF 200 m/min [N/m] | RF 300 m/min [N/m] |
|---|---|---|---|---|---|---|---|
| 5 | 2.50 | 4.3 | 9.2 | 21.4 | 24.7 | 26.5 | 29.6 |
|   | 4.00 | 7.3 | 12.4 | 32.0 | 41.2 | 41.9 | 45.3 |
|   | 6.00 | 10.9 | 20.5 | 39.8 | 45.1 | 42.4 | 49.6 |
| 1 | 4.98 | 13.1 | 32.6 | 68.2 | 71.7 | 76.2 | 73.4 |
|   | 7.46 | 21.6 | 39.1 | 80.2 | 89.2 | 95.5 | 94.7 |
| 2 | 5.36 | 15.0 | 40.5 | 71.6 | 80.4 | 81.3 | 78.5 |
|   | 8.03 | 21.1 | 52.5 | 84.5 | 93.9 | 102.8 | 107.1 |
| 3 | 6.02 | 16.1 | 40.1 | 73.4 | 82.7 | 85.1 | 81.1 |
|   | 9.03 | 29.9 | 55.4 | 86.7 | 92.5 | 104.5 | 118.3 |
| 4 | 6.45 | 17.2 | 44.4 | 77.0 | 84.7 | 83.0 | 82.7 |
|   | 9.67 | 34.3 | 66.9 | 101.8 | 118.9 | 129.3 | 121.9 |

TABLE 2

Dynamic release force behavior relative to
Tesafilm ® No. 4154; crosslinking: 5 seconds at 150° C.

| SiH Compd. of Example | Amount (ppw) | RF 0.3 m/min [N/m] | RF 10 m/min [N/m] | RF 50 m/min [N/m] | RF 100 m/min [N/m] | RF 200 m/min [N/m] | RF 300 m/min [N/m] |
|---|---|---|---|---|---|---|---|
| 5 | 2.50 | 4.8 | 6.0 | 9.2 | 12.6 | 21.1 | 24.5 |
|   | 4.00 | 8.0 | 10.1 | 14.6 | 19.8 | 27.8 | 28.5 |
|   | 6.00 | 9.7 | 18.2 | 25.1 | 28.9 | 31.5 | 30.9 |
| 1 | 4.98 | 9.4 | 16.4 | 22.6 | 31.3 | 39.6 | 42.7 |
|   | 7.46 | 16.8 | 35.6 | 33.6 | 35.2 | 45.5 | 48.9 |
| 2 | 5.36 | 9.7 | 16.5 | 23.8 | 36.8 | 41.4 | 47.4 |
|   | 8.03 | 18.8 | 35.8 | 33.4 | 43.6 | 54.9 | 57.4 |
| 3 | 6.02 | 11.3 | 22.2 | 26.8 | 35.8 | 47.8 | 48.5 |
|   | 9.03 | 20.7 | 39.1 | 43.4 | 46.4 | 57.5 | 59.2 |
| 4 | 6.45 | 11.2 | 24.7 | 29.3 | 39.0 | 47.0 | 48.7 |
|   | 9.67 | 24.6 | 51.8 | 46.8 | 48.2 | 57.6 | 65.8 |

The residual adhesion of the silicone coatings described in Tables 1 and 2, determined by FINAT test method 11, was in each case virtually 100%, as a result of which it is possible to rule out the presence of migrating, oil-like silicone constituents which have not been incorporated by crosslinking; this is also confirmed by the very good results obtained without exception in the ruboff, migration and staining tests (cf. information bulletin on "Dehesive® test methods" from Wacker Chemie GmbH; issued 1991).

The release force values at different peel rates indicated in Tables 1 and 2 for the noninventive adjustment of the release force level by means of different amounts of polymethylhydrosiloxane (Example 5) make it clear that the release force shows a certain dependency on the amount of SiH employed. In particular, a moderate increase in release force relative to the acrylate-containing adhesive of the Tesafilm® No. 7475 can be achieved merely by raising the amount of SiH crosslinker, whereas the release force of the silicone coatings relative to Tesafilm® No. 4154 reacts less sensitively to the amount of SiH employed. As can be seen from Tables 1 and 2, the release force can be raised considerably more by means of the phenyl-containing, SiH-containing copolymers of reduced compatibility, in other words, in the manner of the invention, on average, to two to three times in comparison to the fully soluble polymethylhydrosiloxane. In this case the amount of the SiH crosslinker of reduced compatibility employed was chosen so that the molar SiH/SiCH=CH$_2$ ratio corresponds in each case to that of the 4.00 ppw or 6.00 ppw of polymethylhydrosiloxane-containing silicone coating composition, so that Tables 1 and 2 reveal directly the increase in release force brought about by the reduced compatibility of the SiH crosslinker independently of the SiH content. It is evident, moreover, that as the compatibility of the SiH crosslinker decreases there is, for a given SiH/SiCH=CH$_2$ ratio, a marked increase in the release force values. This shows that the CRA effect of the SiH crosslinkers of reduced compatibility can be obtained firstly by increasing the amount employed and secondly by reducing the compatibility.

Example 6

5.0 g of poly[(dimethylsiloxy)bis(dimethyl-siloxy)ethylnorbornane] are dissolved in 100 g of toluene and the solution is heated to 80° C. Following the addition of 0.27 g of a 10% strength by weight solution of PNCl$_2$ in toluene, 8.0 g of polymethylhydrosiloxane (obtainable commercially from Aldrich GmbH) and 4.0 g of 1,3,5,7-tetramethylcyclotetra-siloxane (obtainable commercially from ABCR GmbH) are added slowly dropwise. Following the removal of readily volatile constituents, a colorless liquid is obtained which according to its $^1$H-NMR, $^{29}$Si-NMR and IR spectra has the following average composition, corresponding to an H content (Si-bonded hydrogen) of 0.984% by weight. The content of the norbornylene-containing structural units which are the cause of reduced compatibility is such that this SiH crosslinker can be mixed homogeneously in any proportion in a dimethylvinylsiloxy-terminal polydimethylsiloxane which has a viscosity at 25° C. of 500 mPa.s without any turbidity being observed:

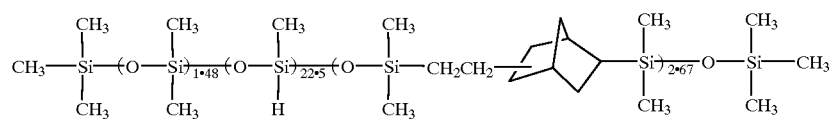

Example 7

20.0 g of dimethylsiloxane-silphenylene copolymer and 210 g of toluene (dried) are heated to 80° C. Following the addition of 0.35 g of a 10% strength by weight solution of $PNCl_2$ in toluene, 25.0 g of polymethylhydrosiloxane (from Aldrich) and 15.0 g of tetramethylcyclotetrasiloxane are added dropwise over the course of 30 minutes. The reaction mixture is stirred at 80° C. for 1 hour and, following the addition of a further 0.35 g of a 10% strength by weight solution of $PNCl_2$ in toluene, is stirred for a further hour at a temperature of 100° C. After it has been cooled, 2.0 g of hexamethyldisilazane (from Aldrich) are added and the mixture is stirred for 30 minutes. After filtration, the low-boiling constituents are removed in vacuo. This gives a clear, colorless oil which according to the $^1$H-NMR, $^{29}$Si-NMR and IR spectra has the following average composition, corresponding to an H content (Si-bonded hydrogen) of 1.02% by weight. The content of the phenylene units, which are the cause of reduced compatibility, is such that this SiH crosslinker can be mixed homogeneously in any proportion in a dimethylvinylsiloxy-terminal polydimethylsiloxane which has a viscosity at 25° C. of 500 mPa.s without any turbidity being evident:

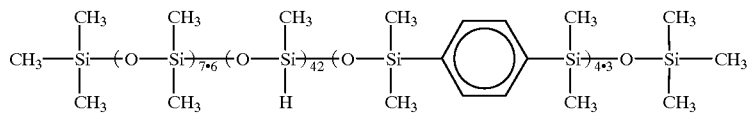

Example 8

The preparation is as in Example 7 with the difference that the reaction time was raised to 2 hours at 100° C.; this gives a clear colorless oil which according to the $^1$H-NMR, $^{29}$Si-NMR and IR spectra has the following average composition, corresponding to an H content (Si-bonded hydrogen) of 0.91% by weight. The content of the phenylene units, which are the cause of the reduced compatibility, is such that this SiH crosslinker, although it can be mixed homogeneously in a dimethylvinylsiloxy-terminal polydimethylsiloxane which has a viscosity at 25° C. of 500 mPa.s nevertheless causes the appearance of a milky white turbidity in the course of mixing:

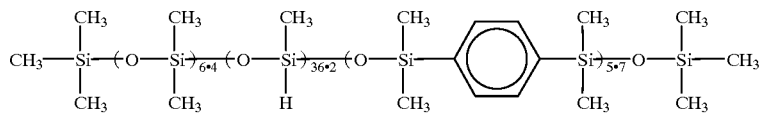

Example 9

10.0 g of 2,2-bis(p-allyloxyphenyl)propane and 30.0 g of polymethylhydrosiloxane (from Aldrich) are mixed and heated to 80° C. Following the addition of 0.10 g of a 10% strength by weight solution of $PNCl_2$ in toluene to the reaction mixture this mixture is stirred at 100° C. for 2 hours. The equilibration catalyst is subsequently deactivated and the product mixture is freed from low-boiling constituents in vacuo. According to the $^1$H-NMR, $^{29}$Si-NMR and IR spectra, the product has the following average composition, corresponding to an H content (Si-bonded hydrogen) of 1.13% by weight. The content of the bisphenol A-like structural units, which are the cause of the reduced compatibility, is such that this SiH crosslinker, although it can be mixed homogeneously in a dimethylvinylsiloxy-terminal polydimethylsiloxane which has a viscosity at 25° C. of 500 mPa.s nevertheless causes the appearance of a milky white turbidity in the course of mixing:

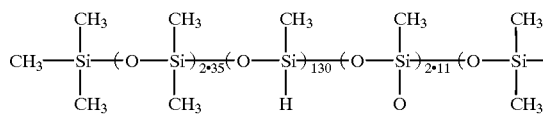
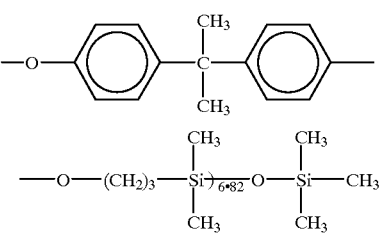

Example 10

9.54 g of allyl 4-tert-butylphenyl ether and 60 g of polymethylhydrosiloxane (from Aldrich) are charged to a round-bottom flask fitted with reflux condenser, stirrer and internal thermometer. 1.2 ml of a solution of a platinum-sym-divinyltetramethylsiloxane complex (solution in cyclohexane with 1% by weight Pt calculated as the element) are added to the above mixture at 80° C. with stirring. After heating at 90° C. for 2 hours, activated carbon is added to the reaction solution which is then filtered. Removal of the volatile components at 60° C. in vacuo (2 mbar) gives 57 g of poly[(methylhydrosiloxane) (methyl tert-butylphenylpropyl ether siloxane)] which according to the $^1$H-NMR, $^{29}$Si-NMR and IR spectra has the following average composition, corresponding to an H content (Si-bonded hydrogen) of 1.33% by weight. The content of the tertbutylphenoxypropyl side groups, which are the cause of reduced compatibility, is such that this SiH crosslinker, although it can be mixed homogeneously in a dimethylvinylsiloxy-terminal polydimethylsiloxane which has a viscosity at 25° C. of 500 mPa.s, nevertheless causes the appearance of a milky white turbidity in the course of mixing:

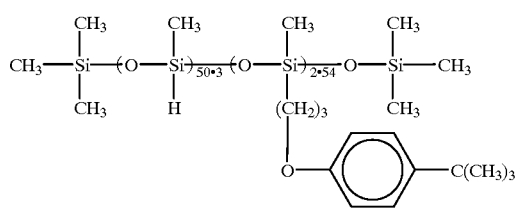

Example 11

16.0 g of poly[(p-phenylenetetramethylsiloxane) (dimethylsiloxane)] and 32.0 g of polymethylhydrosiloxane are mixed and heated to 120° C. under a nitrogen atmosphere. Then 0.12 ml of a 10% strength by weight solution of PNCl$_2$ in toluene are added and the mixture is stirred at 120° C. for 2 hours. It is cooled to 40° C., 1.6 g of hexamethyldisilazane are added, the mixture is stirred for 10 minutes, and the volatile components are removed in vacuo (2 mbar) at 80° C. Filtration gives about 40 g of a clear oil which according to the $^1$H-NMR, $^{29}$Si-NMR and IR spectra has the following average composition, corresponding to an H content (Si-bonded hydrogen) of 1.02% by weight. The content of the phenylene units, which are the cause of reduced compatibility, is such that this SiH crosslinker, although it can be mixed homogeneously in a dimethylvinylsiloxy-terminal polydimethylsiloxane which has a viscosity at 25° C. of 500 mPa.s, nevertheless causes the appearance of a milky white turbidity in the course of mixing:

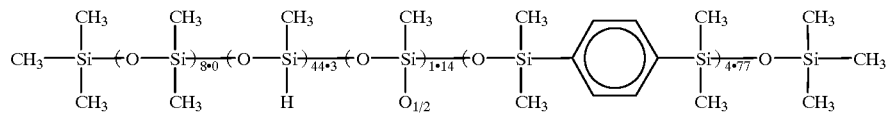

EXAMPLE 12

5.0 g of poly[(dimethylsiloxy)bis(dimethylsiloxy) ethylnorbornane] and 30.0 g of polymethylhydrosiloxane are heated to 80° C. under inert gas. Following the addition of 0.1 ml of a 10% strength by weight solution of PNCl$_2$ in toluene, the mixture is stirred at 100° C. for one hour and then at 120° C. for 15 minutes. The mixture is cooled to room temperature, 0.5 ml of hexamethyldisilazane is added, stirring is continued for 15 minutes and volatile components are removed in vacuo (1 mbar) at 70° C. This gives about 28 g of a slightly turbid oil which in accordance with the $^1$H-NMR, $^{29}$Si-NMR and IR spectra has the following average composition, corresponding to an H content (Si-bonded hydrogen) of 1.40% by weight.

The content of the norbornylene-containing structural units which are the cause of reduced compatibility is such that this SiH crosslinker can be mixed homogeneously in any proportion in a dimethylvinylsiloxy-terminal polydimethylsiloxane which has a viscosity at 25° C. of 500 mPa.s without any turbidity being observed:

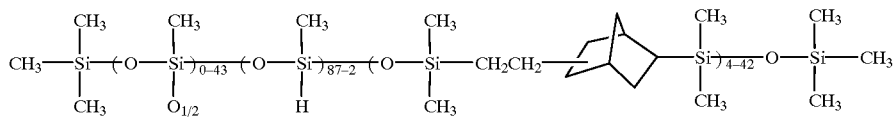

Example 13

10.0 g of a copolymer consisting of dimethylsiloxy units and imide-containing structural units in accordance with the following average composition

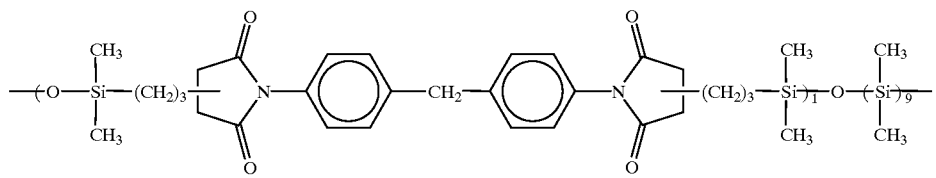

150.0 g of toluene, 75.0 g of polymethylhydrosiloxane and 1.8 g of toluene-4-sulfonic acid are mixed and stirred at 100° C. for 3 hours. After cooling to room temperature, the mixture is filtered through a filter aid and volatile components are removed in vacuo (3 mbar) at 60° C. This gives about 61 g of a reaction product which according to the $^1$H-NMR, $^{29}$Si-NMR and IR spectra has the average composition indicated below, corresponding to an H content (Si-bonded hydrogen) of 1.32% by weight.

The content of the imide-like structural units, which are the cause of reduced compatibility, is such that this SiH crosslinker, although it can be mixed homogeneously in a dimethylvinylsiloxy-terminal polydimethylsiloxane which has a viscosity at 25° C. 500 mPa.s, nevertheless causes the appearance of a milky white turbidity on mixing:

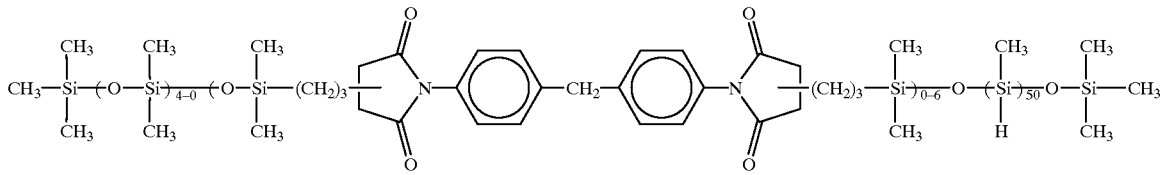

The results of the silicone coatings produced using the SiH-containing crosslinkers described in Examples 5 to 13 are summarized in Tables 3 and 4 (dynamic release force behavior); Example 5 serves as a noninventive comparative example.

TABLE 3

Dynamic release force behavior relative to Tesafilm ® No. 7475; crosslinking: 5 seconds at 150° C.

| SiH Compd. of Example | Amount (ppw) | RF 0.3 m/min [N/m] | RF 10 m/min [N/m] | RF 50 m/min [N/m] | RF 100 m/min [N/m] | RF 200 m/min [N/m] | RF 300 m/min [N/m] |
|---|---|---|---|---|---|---|---|
| 5 | 2.50 | 4.8 | 6.0 | 9.2 | 12.6 | 21.1 | 24.5 |
|   | 4.00 | 8.0 | 10.1 | 14.6 | 19.8 | 27.8 | 28.5 |
|   | 6.00 | 9.1 | 18.2 | 25.1 | 28.9 | 31.5 | 30.9 |
| 6 | 9.63[1] | 31.8 | 100.2 | 98.6 | 102.7 | 105.2 | 111.5 |
| 7 | 6.20[2] | 11.0 | 25.3 | 45.7 | 58.1 | 54.8 | 57.3 |
| 8 | 9.29[1] | 25.1 | 125.2 | 110.3 | 99.4 | 95.6 | 83.7 |
|   | 6.95[2] | 17.9 | 43.3 | 54.7 | 61.5 | 63.7 | 57.1 |
| 9 | 10.42[1] | 35.0 | 125.8 | 101.2 | 100.0 | 99.1 | 104.0 |
|   | 3.50[3] | 8.6 | 14.4 | 20.0 | 25.3 | 28.5 | 30.8 |
|   | 5.59[2] | 10.4 | 17.8 | 25.3 | 30.8 | 38.9 | 38.5 |
| 10 | 2.97[3] | 6.5 | 13.0 | 17.4 | 20.4 | 25.0 | 26.4 |
|   | 5.59[2] | 8.9 | 19.2 | 23.5 | 30.2 | 38.3 | 42.6 |
| 11 | 3.87[3] | 6.1 | 7.7 | 15.2 | 22.5 | 27.4 | 28.7 |

TABLE 3-continued

Dynamic release force behavior relative to
Tesafilm ® No. 7475; crosslinking: 5 seconds at 150° C.

| SiH Compd. of Example | Amount (ppw) | RF 0.3 m/min [N/m] | RF 10 m/min [N/m] | RF 50 m/min [N/m] | RF 100 m/min [N/m] | RF 200 m/min [N/m] | RF 300 m/min [N/m] |
|---|---|---|---|---|---|---|---|
|    | 6.20[2] | 16.3 | 23.8 | 25.5 | 37.1 | 43.3 | 43.5 |
| 12 | 2.82[3] | 5.5  | 10.6 | 20.4 | 21.7 | 24.1 | 26.4 |
|    | 4.51[2] | 9.1  | 20.1 | 31.3 | 38.8 | 38.2 | 42.7 |
| 13 | 2.99[3] | 4.0  | 7.1  | 13.7 | 21.3 | 26.2 | 28.6 |
|    | 4.79[2] | 16.4 | 25.8 | 36.1 | 41.0 | 56.5 | 49.1 |
|    | 7.18[1] | 50.2 | 110.2 | 106.3 | 144.3 | tear | tear |

[1]Equivalent in Si-H content to 6.0 ppw polymethylhydrogensiloxane.
[2]Equivalent in Si-H content to 4.0 ppw polymethylhydrogensiloxane.
[3]Equivalent in Si-H content to 2.5 ppw polymethylhydrogensiloxane.

(RF=release force; the amounts indicated in the footnotes correspond to how many parts by weight of polymethylhydrosiloxane would have to be added in order to introduce the same amount of Si-bonded hydrogen into the silicone coating composition; the term "tear" denotes that the release force has reached a (very high) value which could no longer be recorded by measurement owing to paper tear).

TABLE 4

Dynamic release force behavior relative to
Tesafilm ® No. 4154; crosslinking: 5 seconds at 150° C.

| SiH Compd. of Example | Amount (ppw) | RF 0.3 m/min [N/m] | RF 10 m/min [N/m] | RF 50 m/min [N/m] | RF 100 m/min [N/m] | RF 200 m/min [N/m] | RF 300 m/min [N/m] |
|---|---|---|---|---|---|---|---|
| 5  | 2.50    | 4.8  | 6.0   | 9.2    | 12.6  | 21.1  | 24.5  |
|    | 4.00    | 8.0  | 10.1  | 14.6   | 19.8  | 27.8  | 28.5  |
|    | 6.00    | 9.7  | 18.2  | 25.1   | 28.9  | 31.5  | 30.9  |
| 6  | 9.63[1] | 31.8 | 100.2 | 98.6   | 102.7 | 105.2 | 111.5 |
| 7  | 6.20[2] | 11.0 | 25.3  | 45.7   | 58.1  | 54.8  | 57.3  |
|    | 9.29[1] | 25.1 | 125.2 | 110.3  | 99.4  | 95.6  | 83.7  |
| 8  | 6.95[2] | 17.9 | 43.3  | 54.7   | 61.5  | 63.7  | 57.1  |
|    | 10.42[1]| 35.0 | 125.8 | 1011.2 | 100.0 | 99.1  | 104.0 |
| 9  | 3.50[3] | 8.6  | 14.4  | 20.0   | 25.3  | 28.5  | 30.8  |
|    | 5.59[2] | 10.4 | 17.8  | 25.3   | 30.8  | 38.9  | 38.5  |
| 10 | 2.97[3] | 6.5  | 13.0  | 17.4   | 20.4  | 25.0  | 26.4  |
|    | 5.59[2] | 8.9  | 19.2  | 23.5   | 30.2  | 38.3  | 42.6  |
| 11 | 3.87[3] | 6.1  | 7.7   | 15.2   | 22.5  | 27.4  | 28.7  |
|    | 6.20[2] | 16.3 | 23.8  | 25.5   | 37.1  | 43.3  | 43.5  |
| 12 | 2.82[3] | 5.5  | 10.6  | 20.4   | 21.7  | 24.1  | 26.4  |
|    | 4.51[2] | 9.1  | 20.1  | 31.3   | 38.8  | 38.2  | 42.7  |
| 13 | 2.99[3] | 4.0  | 7.1   | 13.7   | 21.3  | 26.2  | 28.6  |
|    | 4.79[2] | 16.4 | 25.8  | 36.1   | 41.0  | 56.5  | 49.1  |
|    | 7.18[1] | 50.2 | 110.2 | 106.3  | 144.3 | tear  | tear  |

[1]Equivalent in Si-H content to 6.0 ppw polymethylhydrogensiloxane.
[2]Equivalent in Si-H content to 4.0 ppw polymethylhydrogensiloxane.
[3]Equivalent in Si-H content to 2.5 ppw polymethylhydrogensiloxane.

(RF=release force; the amount indicated in the footnotes corresponds to how many parts by weight of polymethylhydrosiloxane would have to be added in order to introduce the same amount of Si-bonded hydrogen into the silicone coating composition; the term "tear" denotes that the release force has reached a (very high) value which could no longer be recorded by measurement owing to paper tear.

The results indicated in Tables 3 and 4 demonstrate that the release force can be tailored within wide limits in the manner of the invention. Through relatively small changes in the concentration of the SiH crosslinker of reduced compatibility it is possible to attain very high release force values, which manifest themselves in paper tear when the laminate is separated. It is evident, moreover, that, depending on the nature of the groups present in the SiH crosslinker that induce the incompatibility, the extent of the repellency of tacky substances, and especially the dynamic release force behavior, can be set at different levels, as a result of which diverse profiles of requirements can in this respect be much better met.

Tables 3 and 4 illustrate that a targeted regulation of release force is possible without modifying the dimethylvinyl-terminal polydimethylsiloxane which forms the principal constituent. In particular, it is possible to do away entirely with the silicone resins which otherwise have to be employed in high concentration to achieve such high release force values.

The residual adhesion tests of the silicone coatings listed in Tables 3 and 4 gave, without exception, values of virtually 100%, which in conjunction with the likewise excellent values for the ruboff, stroke and migration tests demonstrates the complete crosslinking of the silicone coating composition, which takes place within a very short time.

In view of the reduced compatibility of the SiH crosslinkers of the invention it is completely surprising to find that no migrating constituents are present and that the rate of crosslinking is not only not adversely affected but that instead more complete and more rapid crosslinking is observed than with the use of conventional crosslinkers in conjunction with conventional CRAs, especially silicone resins. This is shown below by way of a comparison of the extraction values (i.e. the percentage proportion by weight extractable from the crosslinked silicone film by means of a solvent (toluene)) with the noninventive, silicone resin-containing silicone coating compositions described below:

Example 14 (noninventive comparative example)

The crosslinkable silicone coating composition is prepared by intimately mixing the following constituents: 70 ppw of Dehesive® 920 (obtainable from Wacker Chemie GmbH); 4.3 ppw of a trimethylsiloxy-terminal poly [(dimethylsiloxane)(methylhydrosiloxane)] copolymer which has a viscosity at 25° C. of 35 mPa.s and an H content (Si-bonded hydrogen) of 1.15% by weight; 30 ppw of a vinyl-functional silicone resin which is obtainable under the designation CRA 17 from Wacker Chemie GmbH; 1.0 ppw of a platinum catalyst which comprises 1.0% by weight of platinum (calculated as the element) in the form of a platinum-sym-divinyltetramethyldisiloxane complex which is dissolved in a dimethylvinyl-terminal polydimethylsiloxane (having a viscosity of 1 Pa.s at 25° C.).

Example 15 (noninventive comparative example)

The crosslinkable silicone coating composition is prepared by intimately mixing the following constituents: 40 ppw of Dehesive® 920 (obtainable from Wacker Chemie GmbH); 5.5 ppw of a trimethylsiloxy-terminal poly [(dimethylsiloxane)(methylhydrosiloxane)] copolymer which has a viscosity at 25° C. of 35 mPa.s and an H content (Si-bonded hydrogen) of 1.15% by weight; 60 ppw of a vinyl-functional silicone resin which is obtainable under the designation CRA 17 from Wacker Chemie GmbH; 1.0 ppw of a platinum catalyst which comprises 1.0% by weight of platinum (calculated as the element) in the form of a platinum-sym-divinyltetramethyldisiloxane complex which is dissolved in a dimethylvinyl-terminal polydimethylsiloxane (having a viscosity of 1 Pa.s at 25° C.).

Example 16

The crosslinkable silicone coating composition is prepared by intimately mixing the following constituents: 100 ppw of Dehesive® 920 (obtainable from Wacker Chemie GmbH); 7.5 ppw of the SiH crosslinker of the invention described in Example 8; 1.0 ppw of a platinum catalyst which comprises 1.0% by weight of platinum (calculated as the element) in the form of a platinum-sym-divinyltetramethyldisiloxane complex which is dissolved in a dimethylvinyl-terminal polydimethylsiloxane (having a viscosity of 1 Pa.s at 25° C.)

Example 17

The crosslinkable silicone coating composition is prepared by intimately mixing the following constituents: 100 ppw of Dehesive® 920 (obtainable from Wacker Chemie GmbH); 10.0 ppw of the SiH crosslinker of the invention described in Example 8; 1.0 ppw of a platinum catalyst which comprises 1.0% by weight of platinum (calculated as the element) in the form of a platinum-sym-divinyltetramethyldisiloxane complex which is dissolved in a dimethylvinyl-terminal polydimethylsiloxane (having a viscosity of 1 Pa.s at 25° C.)

The crosslinkable silicone coating compositions described in Examples 14, 15, 16 and 17 were used to produce siliconized release papers in accordance with the procedure already described, with the special features that the crosslinkable silicone coating composition produced by mixing all of the constituents was applied immediately thereafter, or not until after 4 hours, or after 24 hours, to the parchment paper and crosslinked. In addition, different crosslinking times (between 3 and 8 seconds) at a temperature of 150° C. were chosen. The extractables content of the silicone coatings produced in this way was determined directly after the crosslinking step; the results are listed in Table 5. The amounts of SiH crosslinker employed in Examples 14 and 16 and 15 and 17, respectively, were such that the molar $SiH/SiCH=CH_2$ ratio in the silicone coating compositions of Example 14 and 16 and 15 and 17, respectively, is in each case identical in order to ensure comparability of the results.

TABLE 5

Extractables content as a function of crosslinking time and type of CRA

| Storage Time of the Crosslinkable Composition [h] | Cross-linking Time [s] | Extractables, Wt % | | | |
|---|---|---|---|---|---|
| | | Ex. 14 | Ex. 15 | Ex. 16 | Ex. 17 |
| 0 | 6 | 4.6 | 8.2 | 3.2 | 3.2 |
| 0 | 5 | 6.7 | 10.7 | 3.4 | 3.2 |
| 0 | 4 | 7.6 | 11.2 | 4.1 | 4.2 |
| 0 | 3 | 13.2 | 17.3 | 6.5 | 5.8 |
| 4 | 6 | 5.9 | 9.8 | 4.0 | 3.2 |
| 4 | 5 | 8.3 | 12.1 | 3.9 | 4.0 |
| 4 | 4 | 13.4 | 18.7 | 5.2 | 5.3 |
| 4 | 3 | 21.9 | 26.8 | 15.3 | 16.2 |
| 24 | 8 | 5.1 | 9.7 | 3.5 | 3.5 |
| 24 | 6 | 7.9 | 12.8 | 6.5 | 6.4 |
| 24 | 4 | — | 30.4 | 26.3 | 24.2 |

As evident from Table 5, the process of the invention exhibits marked advantages in respect of migrating, extractable constituents over the conventional method (silicone resins as CRAs). The process of the invention proves to be superior even following storage of the crosslinkable composition in the context of the predetermined potlife. Since relatively low extraction values are found in the case of the process of the invention, despite equal molar $SiH/SiCH=CH_2$ ratio of the corresponding Examples 14 and 16 and 15 and 17, respectively, especially at short crosslinking times, it is possible to draw a direct conclusion of an increased crosslinking rate in the case of the process of the invention. This is also confirmed by the onset temperatures of the silicone coating compositions (Example 14 to 17), which for the compositions of the invention (Example 16 and 17) are about 5° C. lower, according to the DSC analyses, than those of conventional silicone resin-containing silicone coating compositions giving comparable release values (Example 14 and 15). This shows that the process of the invention (the silicone coating compositions of the invention) also shows marked advantages relative to the conventional methods in respect of crosslinking rate and the proportion of migrating constituents.

The regulation of release force in accordance with the invention is only of practical value when the tailored release force values are stable, i.e. the release forces exhibit, as far as possible, no change in the course of storage. This is particularly important because the point in time at which processing is carried out by the customer, or at which the laminates produced are used, is generally weeks or months later. In this respect a distinction is made between two techniques: the off-line technique, in which the siliconized paper is first of all rolled up and only later comes into contact with the adhesive-containing material, and the in-line technique, in which laminate formation takes place directly following the siliconizing of the substrate. In both cases it is important that the release force values are stable over a prolonged period. In fact, the inventive process of release force regulation is found, as will be demonstrated below, to be superior in this respect as well to the conventional methods. To this end, long-term tests were conducted in which the siliconized parchment papers were aged by the off-line technique for a prolonged period (up to 12 weeks) at 40° C. following the crosslinking at 150° C. for 5 seconds and aging at 70° C. for 20 hours. The results compiled in Table 6 illustrate the excellent long-term stability of the release force values tailored using the process of the invention, which were determined at a peel rate of 0.3 m/min relative to different types of adhesive.

TABLE 6

Storage time stability of the release force
values established in accordance with
the process of the invention (crosslinking 5 seconds
at 150° C.; peel rate: 0.3 m/min)

| Storage Time (weeks) | Ex. 16 Tesa 4154 RF [N/m] | Ex. 16 Tesa 7475 RF [N/m] | Ex. 16 Tesa 7476 RF [N/m] | Ex. 17 Tesa 4154 RF [N/m] | Ex. 17 Tesa 7475 RF [N/m] | Ex. 17 Tesa 7476 RF [N/m] |
|---|---|---|---|---|---|---|
| 20 h | 12.7 | 27.3 | 25.4 | 28.7 | 41.9 | 24.3 |
| 1 | 12.6 | 33.2 | 20.1 | 30.7 | 51.3 | 19.9 |
| 2 | 13.1 | 31.8 | 22.6 | 33.3 | 53.9 | 22.1 |
| 3 | 13.1 | 30.9 | 20.9 | 33.0 | 54.9 | 23.3 |
| 4 | 13.4 | 32.7 | 25.1 | 35.5 | 53.0 | 26.5 |
| 6 | 14.1 | 30.9 | 24.2 | 31.4 | 54.7 | 30.2 |
| 8 | 15.2 | 35.6 | 28.0 | 33.5 | 55.2 | 28.7 |
| 12 | 15.9 | 37.2 | 30.1 | 37.1 | 58.1 | 30.7 |

What is claimed is:

1. A process for regulating the release force of silicone coatings which are obtained by crosslinking a crosslinkable composition whose constituents comprise alkenyl-functional polyorganosiloxane(s) (A) and SiH-functional organosiloxane(s)

said process comprising selecting as at least a portion of said SiH-functional organosiloxanes, an SiH-functional organosiloxane (B) having from 0.1 to 60 mol-% of radicals which are incompatible with said crosslinkable composition, said radicals being regarded as incompatible with the crosslinkable composition when a mixture of 1 part by weight of SiH-functional organosiloxane (B) having 30 mol-% of incompatible radicals and 9 parts by weight of alkenyl-functional polyorganosiloxane (A) forms more than one phase at 20° C.

2. The process as claimed in claim 1 wherein the release force is increased.

3. A composition which can be crosslinked to give a silicone coating, whose constituents comprise alkenyl-functional polyorganosiloxane(s) (A) and SiH-functional organosiloxane(s), said SiH-functional organpolysiloxanes comprising an SiH-functional organosiloxane(s) (B) having from 0.1 to 60 mol-% of radicals which are incompatible with the composition, said radicals being regarded as incompatible with the composition when a mixture of 1 part by weight of SiH-functional organosiloxane (B) having 30 mol-% of incompatible radicals and 9 parts by weight of alkenyl-functional polyorganosiloxane (A) forms more than one phase at 20° C.

4. An addition-crosslinkable silicone rubber composition as claimed in claim 3, which can be crosslinked to give a silicone coating, whose constituents comprise (A) alkenyl-functional polyorganosiloxane, (B) SiH-functional organosiloxane and (C) hydrosilylation catalyst.

5. A composition which can be crosslinked to give a silicone coating, as claimed in claim 3, wherein the alkenyl-functional polyorganosiloxane (A) is composed of at least 90 mol-% of structural units of the general formula (1)

$$A_2SiO_{2/2} \quad (1)$$

and structural units of the general formula (2)

$$R_aR_bSiO_{(4-a-b)/2} \quad (2)$$

in which

A is a methyl, ethyl, propyl or butyl radical,

R is identical or different at each occurrence and is monovalent, unsubstituted or halo- or cyanosubstituted $C_1$–$C_{10}$ hydrocarbon radicals whose attachment to silicon may be by way of an organic divalent group and which contain aliphatic carbon-carbon multiple bonds, $R^1$ is identical or different at each occurrence and is monovalent, unsubstituted or halo- or cyanosubstituted, SiC-bonded $C_1$–$C_{10}$ hydrocarbon radicals which are free from aliphatic carbon-carbon multiple bonds, and a and b are 0, 1, 2 or 3, with the proviso that there are at least two radicals R in each molecule.

6. A composition which can be crosslinked to give a silicone coating, as claimed in claim 4, wherein the alkenyl-functional polyorganosiloxane (A) is composed of at least 90 mol-% of structural units of the general formula (1)

$$A_2SiO_{2/2} \quad (1)$$

and structural units of the general formula (2)

$$R_aR_bSiO_{(4-a-b)/2} \quad (2)$$

in which

A is a methyl, ethyl, propyl or butyl radical,

R is identical or different at each occurrence and is monovalent, unsubstituted or halo- or cyanosubstituted, $C_1$–$C_{10}$ hydrocarbon radicals whose attachment to silicon may be by way of an organic divalent group and which contain aliphatic carbon-carbon multiple bonds, $R^1$ is identical or different at each occurrence and is monovalent, unsubstituted or halo- or cyanosubstituted, SiC-bonded $C_1$–$C_{10}$ hydrocarbon radicals which are free from aliphatic carbon-carbon multiple bonds, and a and b are 0, 1, 2 or 3, with the proviso that there are at least two radicals R in each molecule.

7. A composition which can be crosslinked to give a silicone coating, as claimed in claim 3, wherein the SiH-functional organosiloxane (B) of reduced compatibility comprises structural units of the general formula (3)

$$A_cR^2_dSiO_{(4-c-d)/2} \quad (3)$$

and structural units of the general formula (4)

$$H_eA_fR^2_gSiO_{(4-e-f-g)/2} \quad (4)$$

in which
>R² is organic or inorganic radicals other than hydrogen and A,
>c and d are 0, 1, 2 or 3,
>e is 1, 2 or 3,
>α and g are 0, 1 or 2, and A is as defined above, with the proviso that (d+g) is from 0.1 to 60 mol-% of (c+d+e+f+g) and each molecule includes at least 2 structural units of the general formula (4), wherein A is a methyl, ethyl, propyl, or butyl radical.

8. A composition which can be crosslinked to give a silicone coating, as claimed in claim 4, wherein the SiH-functional organosiloxane (B) of reduced compatibility comprises structural units of the general formula (3)

  (3)

and structural units of the general formula (4)

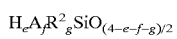  (4)

in which
>R² is organic or inorganic radicals other than hydrogen and A,
>c and d are 0, 1, 2 or 3,
>e is 1, 2 or 3,
>α and g are 0, 1 or 2, and A is as defined above, with the proviso that (d+g) is from 0.1 to 60 mol-% of (c+d+e+f+g) and each molecule includes at least 2 structural units of the general formula (4), wherein A is a methyl, ethyl, propyl, or butyl radical.

9. A composition which can be crosslinked to give a silicone coating, as claimed in claim 2, wherein the hydrosilylation catalysts (C) are selected from platinum, rhodium, palladium, ruthenium and iridium, and compounds thereof which are effective to catalyze hydrosilylation of unsaturated organic radicals.

10. A composition which can be crosslinked to give a silicone coating, as claimed in claim 3, wherein the hydrosilylation catalysts (C) are selected from platinum, rhodium, palladium, ruthenium and iridium, and compounds thereof which are effective to catalyze hydrosilylation of unsaturated organic radicals.

11. A composition which can be crosslinked to give a silicone coating, as claimed in claim 3, wherein the hydrosilylation catalysts (C) are selected from platinum, rhodium, palladium, ruthenium and iridium, and compounds thereof which are effective to catalyze hydrosilylation of unsaturated organic radicals.

* * * * *

UNITED STATES PATENT AND TRADEMARK OFFICE
CERTIFICATE OF CORRECTION

PATENT NO : 6,046,294
DATED : April 4, 2000
INVENTOR(S) : Frank Achenbach et al.

It is certified that error appears in the above-identified patent and that said Letters Patent is hereby corrected as shown below:

Column 31, Claim 5, line 66, "$R_aR_bSiO_{(4-a-b)/2}$" should be --$R_aR^1_bSiO_{(4-a-b)/2}$--.

Column 32, Claim 6, line 39, "$R_aR_bSiO_{(4-a-b)/2}$" should be --$R_aR^1_bSiO_{(4-a-b)/2}$--.

Column 33, Claim 7, line 4, "dare" should be --d are--.

Signed and Sealed this

Sixth Day of March, 2001

Attest:

NICHOLAS P. GODICI

Attesting Officer
Acting Director of the United States Patent and Trademark Office